(12) United States Patent
Dye

(10) Patent No.: US 7,299,103 B1
(45) Date of Patent: Nov. 20, 2007

(54) SYSTEM AND METHOD FOR MONITORING CONSUMABLE USAGE IN PACKAGING MACHINES

(75) Inventor: Gary Robert Dye, Oxford, CT (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 0 days.

(21) Appl. No.: 11/456,898

(22) Filed: Jul. 12, 2006

(51) Int. Cl.
*G06F 19/00* (2006.01)
(52) U.S. Cl. ...................................... 700/108; 700/171
(58) Field of Classification Search .................. 700/17, 700/99, 106, 108, 168, 171, 180; 53/52–58, 53/202; 438/15, 25, 26, 51, 55, 64, 106
See application file for complete search history.

(56) References Cited

U.S. PATENT DOCUMENTS

| | | | |
|---|---|---|---|
| 4,496,237 A * | 1/1985 | Schron | 399/81 |
| 4,719,574 A | 1/1988 | Duback et al. | |
| 4,766,548 A | 8/1988 | Cedrone et al. | |
| 4,800,708 A | 1/1989 | Sperry | |
| 4,854,109 A | 8/1989 | Pinarer et al. | |
| 4,975,647 A * | 12/1990 | Downer et al. | 324/425 |
| 5,271,521 A | 12/1993 | Noss et al. | |
| 5,282,127 A | 1/1994 | Mii | |
| 5,289,372 A | 2/1994 | Guthrie et al. | |
| 5,305,199 A * | 4/1994 | LoBiondo et al. | 705/28 |
| 5,335,483 A | 8/1994 | Gavronsky et al. | |
| 5,376,219 A | 12/1994 | Sperry et al. | |
| 5,608,643 A | 3/1997 | Wichter et al. | |
| 5,942,076 A | 8/1999 | Salerno et al. | |
| 6,003,288 A | 12/1999 | Sperry et al. | |
| 6,233,410 B1 * | 5/2001 | Seber et al. | 399/24 |
| 6,524,230 B1 | 2/2003 | Harding et al. | |
| 6,594,535 B1 * | 7/2003 | Costanza | 700/97 |
| 6,704,617 B2 | 3/2004 | Cherfane et al. | |
| 6,877,297 B2 * | 4/2005 | Armington et al. | 53/502 |
| 7,058,343 B1 * | 6/2006 | Biegelsen | 399/258 |
| 7,085,687 B2 * | 8/2006 | Eckenwiler et al. | 703/1 |
| 2001/0017023 A1 * | 8/2001 | Armington et al. | 53/472 |
| 2002/0007618 A1 * | 1/2002 | Armington et al. | 53/472 |
| 2002/0104293 A1 * | 8/2002 | Armington et al. | 53/472 |

(Continued)

FOREIGN PATENT DOCUMENTS

WO   WO 03/087989   10/2003

*Primary Examiner*—M. N. Von Buhr
(74) *Attorney, Agent, or Firm*—Alston & Bird LLP

(57) ABSTRACT

A system and method for monitoring the use of consumable materials in packaging machines is provided. The system generally includes a plurality of packaging machines that are configured to selectively operate in first and second modes to perform different packaging operations, e.g., by using consumable materials at different consumable usage rates to form different packaging devices. A controller in each machine controls the operation of the machine in the different modes and is configured to communicate the consumable usage data via a port. A portable module can be electronically connected to each machine during a connection session to communicate with the controller and receive the consumable usage data. The data from the module is then received by a user interface that provides an indication to a user of the usage of the machines in the first and second modes, e.g., to indicate to the user which machines are being used to form which packaging devices and/or how much of the operation of the machines is being used to form each of the packaging devices.

26 Claims, 4 Drawing Sheets

U.S. PATENT DOCUMENTS

| | | |
|---|---|---|
| 2004/0215468 A1 | 10/2004 | Deoberl et al. |
| 2005/0010323 A1 | 1/2005 | Cocciadiferro et al. |
| 2005/0087048 A1 | 4/2005 | Knaak et al. |
| 2005/0150192 A1* | 7/2005 | Armington et al. ........... 53/472 |
| 2006/0133854 A1* | 6/2006 | Biegelsen ................... 399/258 |

* cited by examiner

SYSTEM AND METHOD FOR MONITORING CONSUMABLE USAGE IN PACKAGING MACHINES

BACKGROUND OF THE INVENTION

The present invention generally relates to a system and method for monitoring packaging machines and, more particularly, to monitoring the use of consumables in packaging machines, such as foam dispensing machines, that are configured to selectively use consumable materials at various consumable usage rates for forming different types of packaging devices in different modes of operation.

Foam dispensing machines are conventionally used for a variety of packaging operations, such as for packaging an object in a container so that the foam provides a cushioned protection on one or more sides of the object during subsequent handling. One common packaging operation that is used for on-demand protection of packaged objects is foam-in-place packaging. In one foam-in-place packaging operation, a foam-forming composition is injected from a dispensing machine into a container, such as a corrugated board box, and the object, which is typically wrapped to prevent direct contact with the rising (expanding) foam, is surrounded by the foam as the foam expands to fill the void space between the object and the container. The foam-forming composition can be formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged object.

A conventional automated apparatus for performing foam-in-place packaging produces foam-in-bag cushions by making bags from flexible plastic film and dispensing a foam-forming composition into the bags as they are being formed. As the composition expands to form a foam within a bag, the bag is sealed shut and typically is then dropped into a container holding the object to be cushioned. The rising foam again tends to expand into the available space, but does so inside the bag. Because the bags are formed of flexible plastic, they form individual custom foam cushions around the packaged objects. Exemplary types of such packaging apparatus are assigned to the assignee of the present application, and are illustrated, for example, in U.S. Pat. Nos. 4,800,708; 4,854,109; 5,027,583; 5,376,219; and 6,003,288, the entire disclosures of each of which are incorporated herein by reference. For example, foam-in-bag cushions can be formed using the SpeedyPacker™ foam-in-bag packaging system available from Sealed Air Corporation (Saddle Brook, N.J.). Packaging apparatuses, including the SpeedyPacker™ foam-in-bag packaging system, are further described in U.S. application Ser. No. 10/692,579, "Perforation Mechanism for a Foam-in-Bag Cushion and Method of Use," the entire disclosure of which is incorporated herein by reference.

In some cases, the same apparatus or equipment can be used to dispense foam for different types of packaging operations. For example, a single packaging machine can be configured to operate in multiple modes according to the type of packaging to be performed. In a first mode, the machine can be used to form single bags of foam, commonly referred to as wet bags. In this mode, the machine can use a continuous supply of a plastic film sheet to form individual bags. Each bag has a bottom edge and side edges that are sealed, and the bag is filled with foam-forming materials before the top edge is sealed and simultaneously cut, thereby freeing the single bag from the remaining sheet of plastic film. The width of the wet bag is dependent upon the width of the roll of plastic film being used. Common widths for use with the SpeedyPacker™ system are 8, 12, and 19 inches. The length of the bag is determined by the machine operator and can vary depending upon the specific application. The same machine can also be operated in a second mode for producing continuous foam tubes (CFTs). A CFT is a length of multiple foam-filled bags that are still connected, the bags comprising the CFT being generally smaller in size than a typical wet bag. For example, a typical CFT pattern using 19-inch wide film would comprise bags that are approximately five inches in length. A CFT is prepared similarly to a wet bag with the exception that when the top of the bag is sealed after introduction of the foam-forming components, it is not cut free from the remaining length of plastic film. Instead, the bag remains attached to the advancing plastic film and another bag is formed immediately thereafter (i.e., the bottom seal for the next bag is made immediately above the top seal of the previous bag). In this manner, a series of interconnected foam-filled bags is produced. The foam-filled bags are connected by lengths of plastic film that are not foam filled, each length of film connecting the foam-filled bags typically being between about 0.25 inches and about 1 inch.

The same film and foam-forming materials are typically used by the machine in the different modes of operation. That is, the machine can be loaded with a supply of film and a supply of foam-forming materials to be used when forming either wet bags in the first mode of operation or the CFTs during the second mode of operation. Thus, the machine may be so versatile that the type of operation of the machine cannot readily be determined by merely observing the rate of use of the film or the foam-forming materials. Further, the machines may be operated in numerous and/or remote locations such that data cannot easily be collected from the machines by merely observing the operation of the machines.

Thus, there exists a need for an improved system and method for monitoring the use of consumable materials in a plurality of packaging machines and thereby providing an indication of the use of the machines in the different packaging modes.

BRIEF SUMMARY OF THE INVENTION

The present invention provides a system and method for monitoring a use of consumable materials in a plurality of packaging machines that use the materials in different packaging operations. The packaging machines are configured to operate in different modes to form different packaging devices at different consumable usage rates, and consumable usage data collected by the system and method of the present invention can be used to provide an indication of the usage of the machines in the different modes. Thus, the system and method can indicate how the machines are being used, e.g., by indicating what portion of the overall operation of the machines is being used for forming each type of packaging device, which machines are being used to form the different types of packaging devices, or how much of the consumable materials are being used for each type of packaging device.

According to one embodiment of the present invention, the system includes a plurality of packaging machines. Each machine is configured to receive a supply of consumable materials and selectively operate in first and second modes. In the first mode, the machine performs a first packaging operation using the consumable material to form a first packaging device, such as a wet bag, at a first consumable usage rate. In the second mode, the machine performs a second packaging operation to form a second packaging device, such as continuous foam tubes, at a second consumable usage rate. Each machine has a controller for controlling the operation of the machine and a communication port for communication with the controller. Further, the controller of each machine is configured to communicate consumable usage data via the port, the consumable usage data being indicative of a usage of the machine in the first mode and a usage of the machine in the second mode.

The system also includes a portable module that is adapted to be electronically connected to each of the machines via the communication port during a connection session. The portable module communicates with the controller during the session to receive the consumable usage data. A user interface is, in turn, configured to receive the consumable usage data from the portable module and provide an indication to a user of the usage of the machines in the first and second modes. The portable module can also be adapted to receive various types of data from each of the machines, such as a cycle count indicative of a number of operating cycles performed by the machine, an identification of a portable module electronically connected to the machine during a previous session, jaw cycle times indicative of a duration between a signal for controlling a motion of the machine and a resulting motion, shutdown log data indicative of previous terminations of operation of the machine, a value indicative of an input voltage provided to the machine during operation, volumes of the various types of foam dispensed by the machine for each type of packaging device, and/or amounts of film used by the machine for forming foam bags of each type. In addition, the portable module can include a memory configured to store a list of operating instructions for controlling an operation of each of the machines in the first and second modes, and the portable module can transmit the list of operating instructions to each machine to thereby reprogram the machine for operation in the first and second modes. Each machine can provide a power output via the port to thereby power the portable module during the connection session.

The user interface can be provided by a central processing station that is configured to communicate electronically with the portable module to thereby receive the consumable usage data from each of the machines and determine the usage of each machine in the first and second modes according to the consumable usage data from each machine. In particular, the system can include a computer that can be selectively connected to the portable module to receive the consumable usage data from the portable module and communicate the consumable usage data from the portable module to the central processing station. The computer can be configured to increment and monitor a communication schedule indicator, the indicator being indicative of an interval of time between communications from the portable module to the computer and/or an accumulation of consumable usage data between communications from the portable module to the computer. When the communication schedule indicator exceeds a predetermined threshold, the portable module can be configured to prompt a user to transfer the data from the module, e.g., by connecting the module to the computer. The central processing station can compile the consumable usage data from each of the machines and generate a report indicative of usage of the machines in the first and second modes. In some cases, the system is configured to compare the consumable usage data received from a respective one of the machines in the connection session to previous consumable usage data received from the respective machine in a previous connection session to thereby determine a portion of the consumable usage data that is indicative of an operation of the machine since the occurrence of the previous connection session. Further, the system can also include a second plurality of packaging machines that are connected to a network and configured to transmit the consumable usage data via the network to the central processing station, i.e., without requiring the data to be communicated to the portable module.

According to one aspect of the invention, the portable module is characterized by a module identification number and configured to assign a machine identification number to each of the machines. In particular, the portable module can have a counter that is configured to provide an incremental counter value that is incremented with each assignment by the portable module of a machine identification number, so that each machine identification number is representative of the module identification number and the incremental counter value provided when the machine identification number is assigned.

According to one method of the present invention, a portable module is electronically connected to a communication port of one of a plurality of packaging machines to communicate with a controller of the packaging machine in a connection session. In this way, the packaging machine communicates consumable usage data to the portable module via the port, the consumable usage data being indicative of a usage of the machine in the first mode and a usage of the machine in the second mode, e.g., a usage of the machine for dispensing a foam in a consumable film material to form a wet bag in the first mode and continuous foam tubes in the second mode. The consumable usage data is stored in the portable module. The connecting and storing steps are repeated so that the portable module receives and stores consumable usage data for each of the packaging machines. The consumable usage data is transmitted from the portable module to a user interface, which provides an indication to a user of the usage of the machines in the first and second modes. For example, the consumable usage data can be transmitted to a central processing station via a network, and said central processing station can determine the usage of each machine in the first and second modes according to the consumable usage data from each machine. The data communicated from the controller of the machine to the programming module can included a cycle count indicative of a number of operating cycles performed by the machine, an identification of a portable module connected to the machine during a previous session, jaw cycle times indicative of a duration between a signal for controlling a motion of the machine and a resulting motion, shutdown log data indicative of previous terminations of operation of the machine, a value indicative of an input voltage provided to the machine during operation, volumes of types of foam dispensed by the machine for each type of packaging device, and/or amounts of film used by the machine for forming foam bags of each type. A list of operating instructions can also be stored in the portable module and transmitted from the portable module to the machine to thereby reprogram the machine for operation in the first and second modes. In some cases, a second plurality of packaging machines can be connected to a network, and the consumable usage data from the second plurality of packaging machines can be transmitted via the network to the central processing station.

The consumable usage data from each of the machines can be compiled in the central processing station and used to generate a report that is indicative of usage of the machines in the first and second modes. For example, the portable module can be selectively connected to a computer to communicate the consumable usage data from the portable module to the computer and communicate the consumable usage data from the computer to the central processing station. A communication schedule indicator, which can be incremented and monitored, is indicative of a schedule of communication of the consumable usage data from the portable module. When the communication schedule indicator exceeds a predetermined threshold, a user is prompted to transfer the data from module, e.g., by connecting the module to the computer to communicate the consumable usage data to the computer. The consumable usage data received from a respective one of the machines in the connection session can be compared to consumable usage data received from the respective machine in a previous connection session to thereby determine a portion of the consumable usage data that is indicative of an operation of the machine since the occurrence of the previous connection session.

According to one aspect of the invention, the connecting step includes assigning a machine identification number to each machine according to an identification number of the portable module and an incremental counter value provided by the portable module.

BRIEF DESCRIPTION OF THE SEVERAL VIEWS OF THE DRAWINGS

Figure 1:
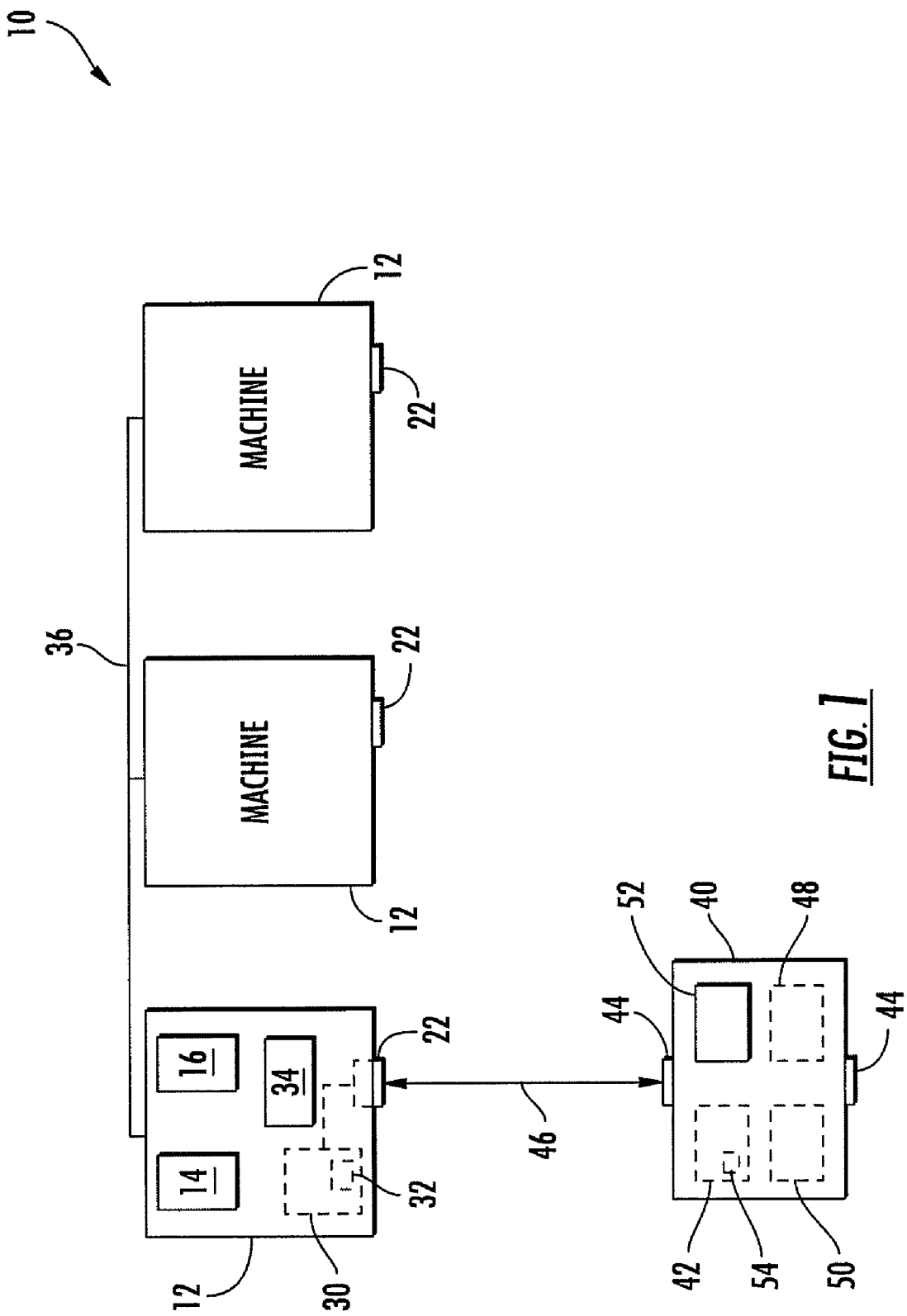
Figure 2:
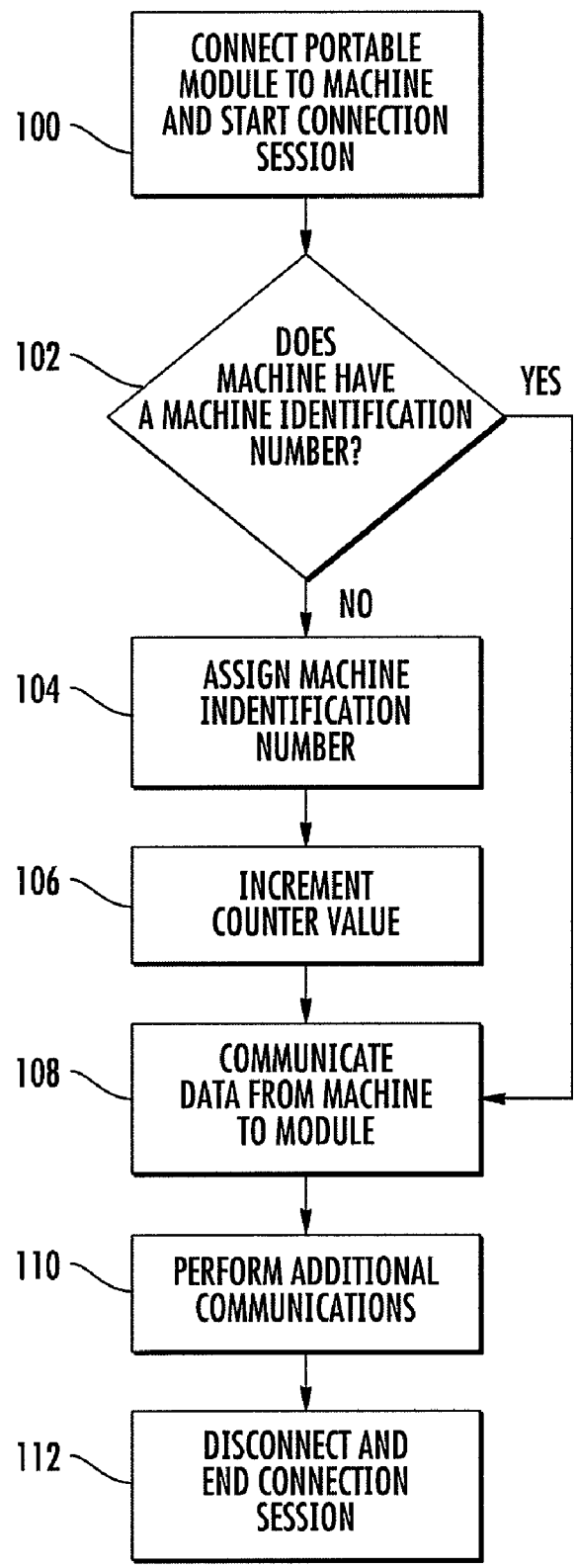
Figure 3:
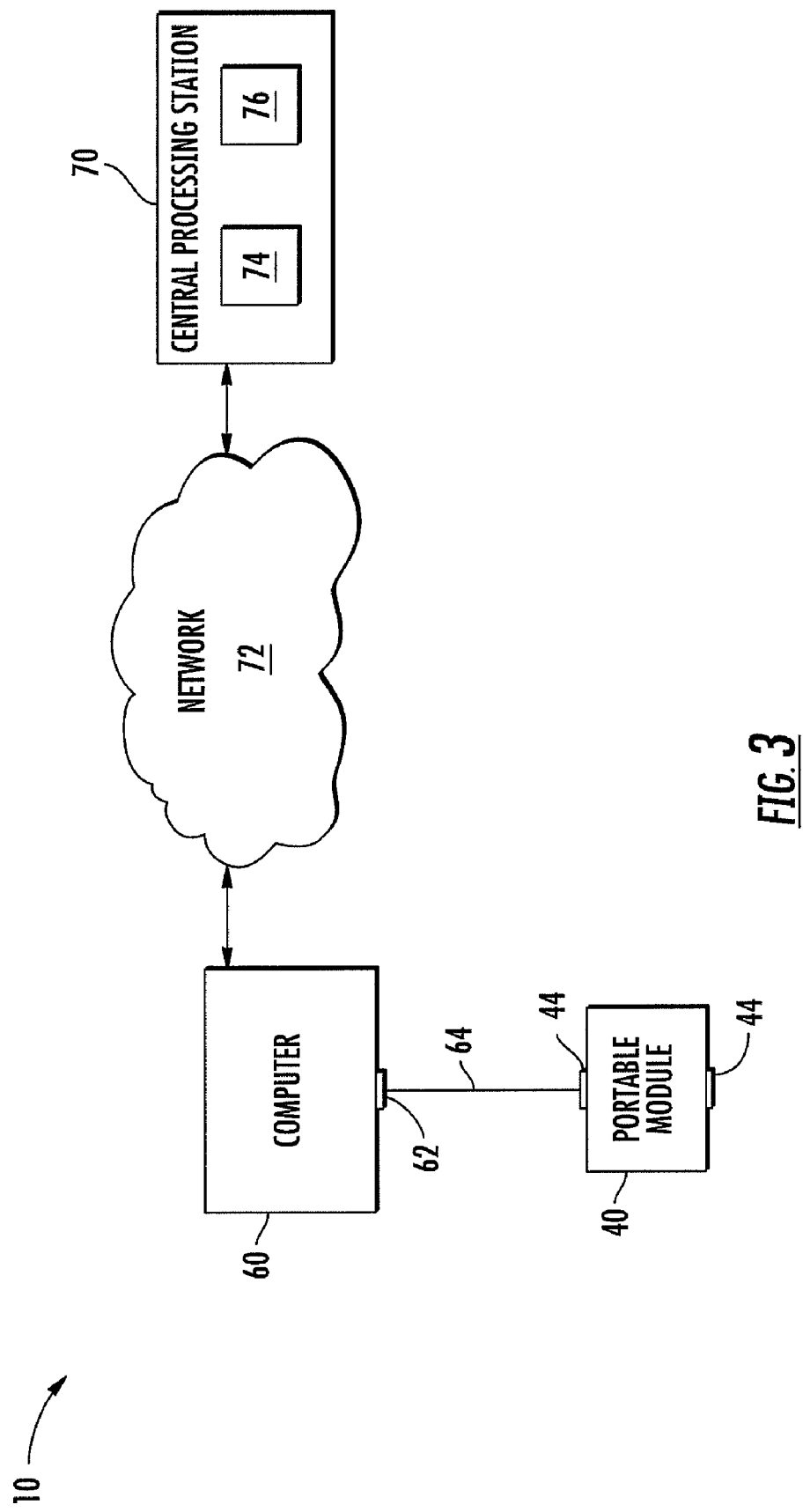
Figure 4:
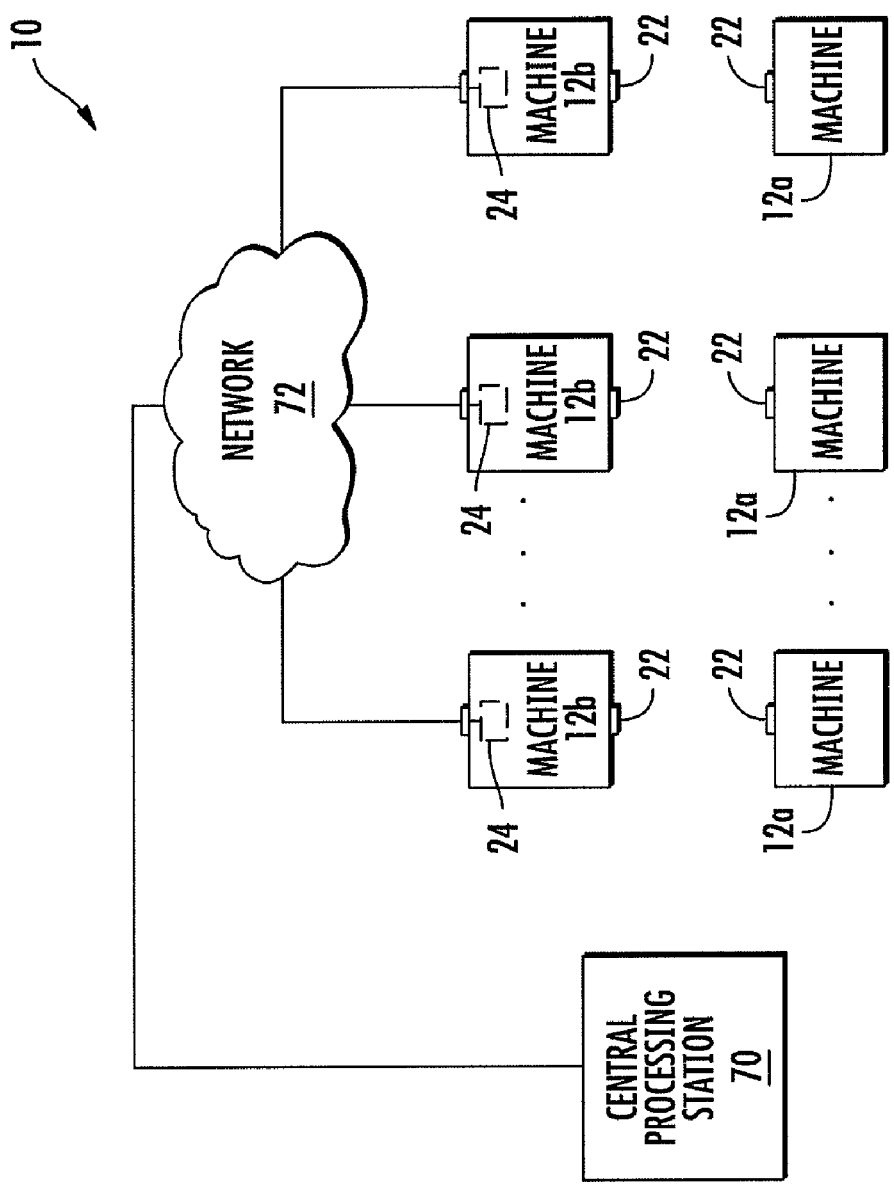

Having thus described the invention in general terms, reference will now be made to the accompanying drawings, which are not necessarily drawn to scale, and wherein:

FIG. 1 is a schematic view illustrating a plurality of packaging machines and a portable module of a system for monitoring the machines according to one embodiment of the present invention;

FIG. 2 is a flow diagram illustrating the operations for communicating data between one of the machines and the portable module;

FIG. 3 is a schematic view illustrating the portable module connected to a computer for communicating with a central processing station of the system for monitoring the machines; and FIG. 4 is a schematic view illustrating a system of packaging machines and a central processing station according to another embodiment of the present invention.

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to the figures and, in particular, to FIGS. 1 and 3, there is shown a system 10 for monitoring the use of consumable materials in a plurality of packaging machines.

The system 10 of the present invention can be used to monitor various types of packaging equipment, such as foam dispensing machines. In one embodiment of the present invention, each of the packaging machines 12 illustrated in FIG. 1 is a foam dispensing machine. Each packaging machine 12 can be configured to operate in multiple modes of operation to perform different types of packaging operations in which different types of packaging devices are formed using similar or dissimilar types of consumable materials. The packaging devices formed in the different modes can differ in size, shape, configuration, or otherwise.

For example, each of the packaging machines 12 can include a SpeedyPacker™ system, which can be used to perform wet bag or CFT packaging operations. That is, each packaging machine 12 can operate in a first mode in which consumable materials are used to produce a first packaging device, i.e., separate wet bags, and in a second mode in which consumable materials are used to produce a second type of packaging device, i.e., CFTs. The consumable materials for forming the wet bags can include a first film 14 and first foam-forming materials 16, and the same or different materials 14, 16 can be used for forming the CFTs. Typically, the rate of usage of the consumable materials is different in the different modes of operation. In particular, the rate of usage of the foam and/or the film for forming the wet bags in the first mode, i.e., a first consumable usage rate, is different than the rate of usage of the foam and/or film for forming the CFTs in the second mode, i.e., a second consumable usage rate. For example, the foam and or film may be used at a faster or a slower rate in either of the modes, and/or the foam and film may be used in different proportions in the different modes. Although the SpeedyPacker™ system is described above as operating selectively in two modes, in some embodiments, this system or other machines 12 can be configured to operate in additional modes, such a third mode for forming a third packaging device characterized by a third consumable usage rate. A third mode (or other additional mode) can also be used for forming a packaging device using a film having a width that is different than the widths used in the other modes.

The machine 12 can be provided with a supply of each type of consumable material required for each of the operations, and the supply consumable materials can be replaced or replenished with similar or dissimilar consumable materials as required for a particular operation.

While the packaging machines 12 are primarily described as foam dispensing machines, it is appreciated that other types of packaging machines can be provided, such that the machines are configured to use different types of consumable materials. For example, the packaging machines can be used to dispense air filled packaging materials, such as materials for forming BUBBLEWRAP® plastic packaging or cushioning material that contains encapsulated air cells (registered trademark of Sealed Air Corporation). Such packaging machines for dispensing air filled packaging materials include the NewAir I.B.™ Inflatable Bubble Cushioning Systems, such as the NewAir I.B.™ 200 Packaging System and the NewAir I.B.™ 600 Packaging System available from Sealed Air Corporation, both of which can be used to inflate and dispense BARRIER BUBBLE® cushioning material (trademark and registered trademark of Sealed Air Corporation). Other packaging machines that can also be used include the Fill-Air® 1000 Inflatable Packaging system available from Sealed Air Corporation, which creates air filled cushions (registered trademark of Sealed Air Corporation), as well as other air fill packaging systems.

Each machine 12 typically includes an electronic controller 30 that controls the operation of the machine 12. The controller 30 can be a programmable device that includes a memory 32 for storing a list of operating instructions. The controller 30 can also be configured to control a display 34 for indicating operational data to a user. For example, the display 34 can be used to indicate the current mode of operation of the machine 12. In addition, the controller 30 can store various types of data in the memory 32. In particular, the memory 32 can store data generally relating to the machine 12, such as a unique machine identification number used to identify the machine 12; data that relates to the operation of the machine 12, such as detailed data regarding the type and amounts (e.g., volume or linear feet) of foams, films, or other consumable materials stored in the machine 12 and dispensed for forming each respective type of packaging device, a count and/or schedule of operating cycles performed by the machine, operating system settings, a shutdown log data indicative of previous terminations of operation of the machine 12, a value indicative of an input voltage provided to the machine 12 during operation, a log of operational motions of the machine 12 such as jaw cycle times that are indicative of a duration between a signal for controlling a motion of the machine 12 and a resulting motion, settings of the machine 12 for controlling the operation thereof, data that relates to communication with the machine, such as a log of communications between the controller 30 and other devices, an identification of one or more devices electronically connected to the machine during communication sessions, security data for controlling access to the controller 30 to service access menus; and the like.

As illustrated in FIG. 1, three separate machines 12 are provided at a single facility for performing separate packaging operations, though any number of machines 12 (including one) can be provided. If multiple machines 12 are present at one facility, the machines 12 can be linked with a data connection 36 or other link, such that any of the machines 12 can be used to communicate with the controller 30 or memories of the other machines.

A portable module 40 is used to communicate with the controller 30 in each of the machines 12. The portable module 40 can be a handheld device that is carried by a user, such as a service representative who monitors the use of the machine 12. For example, the portable module 40 can be a dedicated device that is built specifically for monitoring the machines 12, or the module 40 can be a personal digital assistant (PDA) that is programmed and/or otherwise adapted to perform the monitoring functions. In either case, the module 40 can be a pocket-sized device that is carried by the service representative during periodic visits to facilities where the machines 12 are used.

The portable module 40 typically includes a processor 42 that is configured to communicate with each of the machines 12 during a connection session. In this regard, the module 40 includes one or more communication ports 44 configured to establish an electronic connection with a corresponding port 22 of the machine 12 for communication. Each communication port 44 can be configured for wired or wireless communication. For example, a connection 46 illustrated in FIG. 1 can be provided by a communication cable having one end that is received by one of the communication ports 44 so that the portable module 40 is physically connected by the cable to the machine 12 when an opposite end of the cable is connected to the port 22 of the machine 12. In particular, the communication ports 44 of the module 40 can include a serial and/or parallel port for communicating information or data with the machines 12. Alternatively, communication ports 44 can be configured to communicate wirelessly, and the connection 46 can be a wireless connection. For example, the communication ports 44 can include a transceiver configured for wireless communication protocols, such as an infrared communication protocol, a Bluetooth® protocol (registered trademark of Bluetooth Sig, Inc.), a Zigbee protocol (registered trademark of Zigbee Alliance Corporation), and the like. The communication ports 44 can also be configured to connect to an external communication device, such as a cellular modem module, such that the controller 30 can communicate with the machines 12 via the external device.

If the module 40 is physically connected to the machine 12 by a cable, the cable can provide a power connection between the portable module 40 and the machine 12. In this regard, the machine 12 can provide a power output via the connection of the port 22, 44 to provide sufficient power for operating the portable module 40 during the connection session. Thus, in some cases, the portable module 40 can be configured to be powered exclusively by an external power source during the connection session. In other cases, the module 40 can instead include a battery 48 that provides some or all of the power for operation.

The portable module 40 includes a memory 50, and the controller 30 or processor 42 can control a communication of data from the memory 50 to the machine 12 and/or from the machine 12 to the memory 50 during a connection session. For example, the memory 50 can store a list of operating instructions for controlling an operation of each of the machines 12 in the different operational modes, and the list of instructions can be communicated to the machine 12 to thereby program (or reprogram) the machine 12 for operation. Thus, if a new version of the operating instructions is developed, the new version can be stored in the programming module 40 and then easily distributed by communicating the new version from the programming module 40 to the machine 12 during a connection session to update the version on the machine 12. The portable module 40 can also be configured to receive any or all of the data stored in the memory 32 of the machine 12, such as operating instructions. Thus, if a service representative wishes to copy instructions from one machine 12 to another machine 12, the service representative can copy the instructions from one machine 12 to the portable module 40 during one connection session and then copy the instructions from the portable module 40 to the other machine 12 during a subsequent connection session.

The portable module 40 can include a display 52 for providing information to a user and/or such information can be displayed using a display of a machine 12 connected thereto. For example, as illustrated in FIG. 1, the display 52 of the portable module 40 can be a liquid crystal display, one or more lights, LEDs, or other visual or audible indicators. In one embodiment, the display 52 provided on the module 40 is relatively simple, including, e.g., a few LEDs to indicate an operational status of the module 40. In addition, or alternative, to the use of the display 52, the portable module 40 can direct the machine 12 to display information to the user during a connection session. In particular, the portable module 40 can direct the machine 12 to display information on the display 34, e.g., to indicate a status of the portable module 40, request input from the user, provide operational data to the user, and the like.

The data that is communicated from the machine 12 to the controller 30 during each connection session, and then stored in the module 40, can include consumable usage data, such as the type and/or amount of film and/or foam-forming materials used by the machine 12. For example, the consumable usage data can include a list indicating the type and amount of each consumable material used by the machine 12 for each of the different modes of operation, i.e., for forming each of various types of packaging devices. In particular, the list can include an entry for each dispensing operation, or cycle time for dispensing foam-forming material, that is used. Thus, each entry can be indicative of the type and amount of consumable materials used to form each wet bag and the consumable materials used to form each bag of each CFT. Alternatively, each entry can be indicative of the type and/or total amount of consumable material used to form all of the wet bags and the type and/or total amount of consumable material used to form all of the CFTs. Other data that can be stored in the memory 32 of the machine 12, communicated to the module 40 during a connection session, and then stored in the module 40 can include any of the other information stored in the machine 12, such as a cycle count that is indicative of a number of operating cycles performed by the machine 12; an identification of a portable module 40 electronically connected to the machine 12 during a previous connection session; jaw cycle times of the machine 12, which are indicative of a duration between a signal for controlling a motion of the machine 12 and a resulting motion; a shutdown log data indicative of previous terminations of operation of the machine 12; a value indicative of an input voltage provided to the machine 12 during operation; volumes or weights of the types of foam dispensed by the machine 12 for each packaging operation or each type of packaging operation; and the amounts of film used by the machine 12 for forming each packaging device or each type of packaging device.

The portable module 40 can also communicate other types of data with the machines 12 during each connection session. In particular, in some cases, the portable module 40 can be configured to assign a machine identification number to the machine 12. For example, if the machine 12 does not have a machine identification number, e.g., if the controller 30 was not programmed with a machine identification number during manufacture and no machine identification number has been assigned to the machine 12 during a previous connection session, the portable module 40 can create a unique machine identification number for the machine 12 and communicate the machine identification number to the controller 30 of the machine 12 for use during subsequent connections sessions.

In one embodiment, the system 10 includes multiple portable modules 40 so that each module 40 can be used separately by a respective service representative for collecting consumable usage data from machines 12 in various facilities. Each portable module 40 is characterized by a module identification number, i.e., a serial or other number that is unique to the portable module 40. Further, the portable module 40 includes a counter 54 that is configured to provide an incremental counter value that is incremented with each assignment by the portable module 40 of a machine identification number. The portable module 40 assigns a machine identification number that is representative of the module identification number and the counter value.

FIG. 2 provides a flow diagram illustrating the operations for communicating data between one of the machines 12 and the portable module 40 according to one embodiment of the present invention. As illustrated, the portable module 40 is connected to the machine at block 100 to start a connection session for communication between the devices. At block 102, the portable module determines whether the machine 12 has a machine identification number, i.e., whether the machine 12 has previously been assigned a machine identification number, e.g., at the time of manufacture or during a previous connection session with the same portable module 40 or with another portable module 40. If the machine 12 does not have a machine identification number, the portable module 40 assigns a machine identification number to the machine 12 at block 104. For example, if the portable module 40 has a module identification number of 12345 and the counter 54 of the module 40 has a counter value of 10000, the portable module 40 can assign the machine 12 a unique machine identification number by appending the counter value to the module identification number, i.e., 12345-10000. Upon assigning the machine identification number, the counter value of the module 40 increments to 10001 (block 106), so that the next machine identification number assigned by the module 40, to the next machine 12 that is encountered without a pre-assigned number, would be 12345-10001.

In this way, all of the machine identification numbers assigned by the different programming modules 40 are unique. Further, each machine identification number is representative of the portable module's identification number and the incremental counter value that is provided when the machine identification number is assigned, such that the portable module 40 used to assign the number can be identified by the machine identification number of the machine 12, and the machine identification number also provides an indication of the order or timing of the assignment. If each portable module 40 is associated with a respective service representative, the machine identification number also provides an indication of the identity of the service representative that conducted the connection session to assign the machine identification number. For example, a first service representative might have a portable module 40 with a module identification number of 50032, and a second service representative might have a portable module 40 with a module identification number of 50033, such that machine identification numbers assigned by the first service representative begin with 50032, and machine identification numbers assigned by the second service representative begin with 50033.

Referring again to FIG. 2, after assigning the machine identification number, or determining that the machine 12 already has a machine identification number, the portable module 40 continues with the communication of the connection session. For example, the portable module 40 can receive a communication of data, such as the consumable usage data, from the machine 12 at block 108. Additional communications performed at block 110 can include accessing one or more service menus of the machine 12, accessing other data such as a shutdown log, uploading or downloading programming such as a particular version of a list of operating instructions, and the like. For example, the portable module can allow a service representative to access a service menu of the machine 12 to view and/or edit machine settings, which may be inaccessible without the portable module 40. Such settings can include, e.g., operational parameters relating to the timing and mixture of foam forming materials dispensed in each foam dispense cycle performed in a packaging operation. Thereafter, at block 112, the portable module 40 is disconnected from the machine 12, and the connection session is ended.

After one or more connection sessions with one or more of the machines 12, the data stored in the portable module 40 is communicated from the module 40 to another device, such that the consumable usage data can be provided to a user interface that uses the consumable usage data to provide an indication to a user regarding the usage of the machines 12 in the various modes of operation. For example, as shown in FIG. 3, the portable module 40 can be connected to a computer 60 by an electronic connection 64, and the computer 60 can communicate the portable module 40 to a remote central processing station 70. The computer 60 can be a laptop or other portable computer 60 to which the service representative periodically transfers data from the module 40. In other embodiments, the computer 60 can instead be another processing and/or communication device, such as a cellular modem module. The computer 60 and the central processing station 70 can be configured to communicate via a network 72, such as the Internet or a limited-access network, such that the computer 60 and central processing station 70 can be connected via the network 72. Thus, in one typical method of operation, the service representative can carry the portable module 40 to various facilities where the packaging machines 12 are located, collect consumable usage data with the portable module 40, and then periodically download the data to the computer 60 so that the computer 60 then communicates the data to the central processing station 70. In this way, the data can be collected using a module 40 that can be relatively small and easily portable. Further, the machines 12 and the portable module 40 need not be provided with direct connections to the central processing station 70 or the network 72. Alternatively, the portable module 40 can be configured to be selectively connected to the network 72; however, it is appreciated that this typically requires additional communication capability by the module 40, e.g., by including a modem or other communication device in the module 40.

The portable module 40 can communicate with the computer 60 using various protocols, using the same port 44 that communicates with the machines 12 or using a different port. In some cases, the communication via the connection 64 between the portable module 40 and the computer 60 can be effected wirelessly. Typically, a wired connection is provided by a cable that physically connects the portable module 40 to the computer 60, e.g., a cable that is the same as or different from the cable that can be used to connect the module 40 to the machine 12. The cable can provide a power connection between the portable module 40 and the computer 60 so that the computer 60 provides a power output via port 62 to the port 44 of the portable module 40 to thereby provide sufficient power for operating the module 40. For example, one end of the cable can be connected to a USB port of the computer 60, which provides a power output. The opposite end can connect to a USB port of the portable module 40 or another type of port, such a serial port that is modified to include a power input by which the portable module 40 is energized for operation. As noted above, the portable module 40 can instead include a battery 48 that provides the necessary power for operation. In some cases, the battery 48 can be charged by the computer 60 while the portable module 40 is connected thereto.

In addition to communicating the data received from the machines 12 to the computer 60, other data can also be communicated between the portable module 40 and the computer 60. For example, the portable module 40 can receive operating instructions that are subsequently used to program the machines 12, security data needed for gaining access to the machines 12, and the like.

The system 10 can be configured to automatically prompt the user to connect the portable module 40 to the computer 60 to transfer data from the machines 12. In this regard, the system can provide a communication schedule indicator that is characteristic of the communication schedule of the consumable usage data. For example, in one embodiment, the portable module 40 or the computer 60 provides the communication schedule indicator, which can be a stored value that is incremented according to the passage of time between communications from the portable module 40 to the computer 60 or according to the number of connection sessions between transfers of data to the computer 60. Thus, the indicator can provide an indication of how recently the data has been transferred from the portable module 40, how many connection sessions have been conducted since the last transfer of data from the portable module 40, or how much data has been received by the portable module 40 since the last transfer of data therefrom. The portable module 40 or the computer 60 can monitor the communication schedule indicator to determine if the indicator exceeds a predetermined threshold. If the indicator exceeds the threshold, thereby indicating that the data should be communicated from the module 40, the computer 60 and/or the module 40 can prompt the user to connect the module 40 to the computer 60. For example, the module 40 or the computer 60 can provide a visual or audible indicator when the indicator is exceeded. In some cases, the portable module 40 can be configured so that the module 40 cannot be used to perform additional connection sessions and obtain additional consumable usage data after the threshold is exceeded beyond a predetermined amount. For example, the display 34 of the module 40 can include an indicator, such as a light emitting diode, that is normally on during use, and the module 40 can turn the indicator off when the module cannot receive additional consumable usage data, e.g., when the memory 50 is full or when a malfunction or error prevents the receipt of additional data.

The central processing station 70 typically includes a computer that is configured to receive the data via the network 72, store the data in a storage system 74, and analyze the data, e.g., to generate a report. The central processing station 70 can determine and compile data relating to a particular machine 12 and/or a group of machines 12. In this regard, the consumable usage data received from each packaging machine 12 is indicative of a usage of the consumable material during operation of the machine 12 in the first mode of operation and a usage of the consumable material during operation of the machine 12 in the second mode of operation. In particular, the central processing station 70 can determine an amount by which the machine 12 is operated in the first mode of operation for forming a first type of packaging device according to the usage of the consumable material in the first mode, and an amount by which the machine 12 is operated in a second or other mode of operation for forming a second type of packaging device according to the usage of the consumable material in the second mode.

The consumable usage data provided to the central processing station 70 can include totals of the usage of each consumable material for each type of packaging operation, and/or the data can include a list of entries, with each entry representing one particular packaging operation. For example, in a list of entries, each entry can indicate the amount of each consumable material that was used to form one packaging device. In some cases, each entry can also include a time stamp (e.g., date and/or time of day) that indicates when the packaging operation was performed. Alternatively, the entries can be provided without a time stamp, e.g., if the machine 12 does not include a real-time clock or if the machine 12 is not configured to record the time. If a time stamp is not provided by the machine, a time stamp can be provided with the data by other devices in the system, e.g., by applying a time stamp to a batch of data according to a clock of the portable module 40 when the batch of data is collected thereby, or by applying a time stamp to a batch of data according to a clock of the computer 60 when the batch of data is transferred from the module 40 to the computer 60.

If time stamps are provided with the entries, the system can use the time stamps to determine which data has been previously received and analyzed. For example, the central processing station 70 can record the time stamp of the last entry that is received and analyzed, e.g., Jun. 1, 2006, 13:21:04. Then, when additional data from a subsequent connection session is received for that same machine 12, the central processing station 70 can determine that the entries occurring prior to the time of the last entry that was previously received, i.e., Jun. 1, 2006, 13:21:04, have already been received and can be discarded as repeat data, with only more recent entries being added for analysis.

Alternatively, if a respective machine 12 is not configured to provide time stamp(s) with the consumable usage data, the central processing station 70 can compare the entries that are received from that machine 12 to the entries previously received from the same machine 12 to determine which entries have previously been received and analyzed. For example, if the central processing station 70 receives a first batch of entries from a first connection session performed by the module 40 on a first date and a second batch of entries performed by the same or different module 40 on a second date for the same machine 12, the central processing station 70 can compare a pattern of entries from the end of the first batch to the entries in the second batch to determine where the same pattern exists in the second batch. The central processing station 70 can determine that any entries prior to that pattern were previously received in the first batch and therefore are not considered new data in the second batch. The entries after that pattern can be considered as new data that was generated since the first batch of data acquired in the first connection session. Similarly, the portable module 40 and/or the computer 60 can also be configured to compare the consumable usage data that is received from a respective machine 12 in one connection session to previous consumable usage data that was received from the same machine 12 in a previous connection session to thereby determine which portion of the data is new, i.e., which data is indicative of an operation of the machine 12 that has occurred since the previous connection session.

In addition, the central processing station 70 can analyze the consumable usage data to determine when a supply of consumable material should be replenished. For example, the central processing station 70 can determine the current inventory of each consumable material in a particular machine 12 or at a particular facility according to a previous inventory, previous replenishments, and use of each material according to the consumable usage data. Under certain circumstances, such as when a supply of a consumable material is depleted or reduced below a threshold value, the central processing station 70 can be configured to automatically initiate an order for a replenishment or initiate an alert. Such an order or alert can be issued electronically to a person at the central processing station 70, the facility where the machine 12 is located, and/or otherwise. For example, such alerts can be issued by sending an email to a person responsible for one or more aspects of the operation of the machine 12 in order to notify the person that additional material may be required at a certain time.

As noted above, the central processing station 70 can be configured to compile data for reports on the multiple machines 12. For example, one or more of the portable modules 40 can be used to collect consumable usage data from multiple machines 12, which can be operated at a variety of facilities in different locations. The portable modules 40 can communicate the data to the central processing station 70, and, in some cases, some of the machines 12 can communicate data directly to the central processing station 70, e.g., as described below in connection with FIG. 4. The central processing station 70 can compile the data to generate a report that is indicative of the operation of multiple machines 12. For example, the central processing station 70 can generate a report that indicates how much of a particular consumable material was used by all of the machines 12 or by a particular group of the machines 12, what portion of the machines 12 have been used for a particular type of packaging operation, what portion of operational time for a group of machines was used for a particular type of packaging operation, the total operation of a group of machines, and the like. Such information can be useful in determining how the machines are being used, how much the machines are being used, what type of consumable materials are being used, and the like.

The central processing station 70 can output information in the form of data or reports to a user via a user interface 76, which can be a video monitor, a printer, or the like. Thus, a user can view or otherwise receive the information from the user interface 76. In some cases, the information provided by the central processing station 70 can be used to understand the actual usage of the machines 12 and used to improve the marketing of the machines 12 and/or the consumable materials, e.g., by further describing or marketing underutilized aspects of features of the machines 12.

FIG. 4 illustrates a system 10 of packaging machines according to another embodiment of the present invention, in which some of the machines 12*a* communicate with the central processing station 70 via the portable module 40, while other machines 12*b* communicate with the central processing station 70 without the use of the portable module 40. The various machines, which are collectively designated by reference numeral 12, can be distributed in different facilities and used in separate packaging operations, e.g., with some of the machines 12 provided in facilities where connections to a communication network are available and some of the machines 12 provided in facilities where connections to a communication network are unavailable or undesirable. In particular, the machines 12*a* in a first plurality are configured to be electronically connected with the portable modules 40 to communicate with one of the modules 40 during a connection session, such that the consumable usage data from each machine 12*a* can be transferred to the portable module 40 and to the central processing station 70 as described above. Accordingly, the machines 12*a* in the first plurality need not be connected to a communication network.

The machines 12*b* in a second plurality are connected to a communication network 72 such that the machines 12*b* can communicate with the central processing station 70 via the network 72, i.e., without requiring data to be communicated intermediately to the portable module 40. In particular, each of the second plurality of machines 12*b* can include a modem or other communication device 24 for connecting to the communication network 72. Various types of networks can be used for communication and, in some cases, the network 72 used for communication between the second plurality of machines 12*b* and the central processing station 70 can be the same network 72 that is accessed by the computer 60 or portable module 40 for communicating data from the first plurality of machines 12a. The machines 12b in the second plurality may or may not additionally include ports 22 for communicating with one of the portable modules 40 as described above. In either case, the central processing station 70 can receive data from machines 12 in the first and second pluralities, some of the data being received via the portable module 40 and some of the data being received directly from the machines 12 via the network 72. Thus, even though some machines 12 may have direct access to a network and other machines 12 may not have direct access to the network, data from the machines 12 can be received and compiled in the central processing station 70, e.g., to generate a report indicative of the use of all of the machines 12.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for monitoring a use of a plurality of consumable materials in a plurality of packaging machines, the system comprising:
   one or more packaging machines, each machine being configured to receive a supply of consumable materials and selectively operate in at least first and second modes, such that the machine in the first mode performs a first packaging operation using the consumable at a first consumable usage rate and in the second mode performs a second packaging operation using the consumable material at a second consumable usage rate, and each machine having a controller for controlling the operation of the machine and a communication port for communication with the controller, the controller of each machine being configured to communicate consumable usage data via the port, the consumable usage data being indicative of a usage of the machine in the first mode and a usage of the machine in the second mode;
   a portable module adapted to be electronically connected to each machine via the communication port during a connection session and thereby communicate with the controller during the session such that the portable module is configured to receive the consumable usage data from the controller; and
   a user interface configured to receive the consumable usage data from the portable module and provide an indication to a user of the usage of the one or more machines in the first and second modes.

2. A system according to claim 1, further comprising a central processing station providing the user interface, the central processing station configured to communicate electronically with the portable module to thereby receive the consumable usage data from each machine and determine the usage of each machine in the first and second modes according to the consumable usage data from each machine.

3. A system according to claim 2, wherein the system comprises a first plurality of the packaging machines, and further comprising a second plurality of packaging machines, each machine of the second plurality being connected to a network and configured to transmit the consumable usage data via the network to the central processing station.

4. A system according to claim 2 wherein the central processing station is configured to compile the consumable usage data from each machine and generate a report indicative of usage of the one or more machines in the first and second modes.

5. A system according to claim 2, further comprising a computer configured to be selectively connected to the portable module to receive the consumable usage data from the portable module and communicate the consumable usage data from the portable module to the central processing station.

6. A system according to claim 5 wherein the system is configured to increment and monitor a communication schedule indicator that is indicative of a schedule of communication of the consumable usage data from the portable module, and the portable module is configured to prompt a user to transfer the consumable usage data from the portable module when the communication schedule indicator exceeds a predetermined threshold.

7. A system according to claim 1 wherein the portable module is characterized by a module identification number and configured to assign a machine identification number to each machine, the portable module having a counter configured to provide an incremental counter value that is incremented with each assignment by the portable module of a machine identification number, each machine identification number being representative of the module identification number and the incremental counter value provided when the machine identification number is assigned.

8. A system according to claim 1 wherein the portable module has a memory configured to store a list of operating instructions for controlling an operation of each machine in the first and second modes, the portable module being configured to transmit the list of operating instructions to each machine to thereby reprogram the machine for operation in the first and second modes.

9. A system according to claim 1 wherein the portable module is adapted to receive data from each machine including at least one of a cycle count indicative of a number of operating cycles performed by the machine, an identification of a portable module electronically connected to the machine during a previous session, jaw cycle times indicative of a duration between a signal for controlling a motion of the machine and a resulting motion, shutdown log data indicative of previous terminations of operation of the machine, a value indicative of an input voltage provided to the machine during operation, volumes of types of foam dispensed by the machine, and amounts of film used by the machine for forming foam bags.

10. A system according to claim 1 wherein each machine is configured to dispense a foam in a consumable film material to form a wet bag in the first mode and continuous foam tubes in the second mode.

11. A system according to claim 1 wherein the system is configured to compare the consumable usage data received from a respective machine in the connection session to a previous consumable usage data received from the respective machine in a previous connection session to thereby determine a portion of the consumable usage data that is indicative of an operation of the machine since the occurrence of the previous connection session.

12. A system according to claim 1 wherein each machine is configured to provide a power output via the port to thereby power the portable module during the connection session.

13. A method of monitoring a use of a plurality of consumable materials in a plurality of packaging machines, each machine being configured to receive a supply of consumable material and selectively operate in at least first and second modes such that each machine performs a first packaging operation in the first mode at a first consumable usage rate and a second packaging operation in the second mode at a second consumable usage rate, the method comprising:
connecting a portable module electronically to a communication port of one of a plurality of packaging machines to communicate with a controller of the packaging machine in a connection session such that the packaging machine communicates consumable usage data to the portable module via the port, the consumable usage data being indicative of a usage of the machine in the first mode and a usage of the machine in the second mode; and
storing the consumable usage data in the portable module;
repeating the connecting and storing steps such that the portable module receives and stores consumable usage data for each of the packaging machines; and
transmitting the consumable usage data from the portable module to a user interface to provide an indication to a user of the usage of the machines in the first and second modes.

14. A method according to claim 13 wherein said transmitting step comprises transmitting the consumable usage data to a central processing station via a network, and wherein the central processing station determines the usage of each machine in the first and second modes according to the consumable usage data from each machine.

15. A method according to claim 14, further comprising connecting each of a second plurality of packaging machines to a network and transmitting the consumable usage data from the second plurality of packaging machines via the network to the central processing station.

16. A method according to claim 14, further comprising compiling the consumable usage data from each of the machines in the central processing station and generating a report indicative of usage of the machines in the first and second modes.

17. A method according to claim 14, further comprising selectively connecting the portable module to a computer to communicate the consumable usage data from the portable module to the computer and communicate the consumable usage data from the computer to the central processing station.

18. A method according to claim 17, further comprising:
incrementing and monitoring a communication schedule indicator that is indicative of a schedule of communication of the consumable usage data from the portable module; and
prompting a user to transfer the consumable usage data from the module when the communication schedule indicator exceeds a predetermined threshold.

19. A method according to claim 13 wherein said connecting step further comprises assigning a machine identification number to each machine according to an identification number of the portable module and an incremental counter value provided by the portable module.

20. A method according to claim 13, further comprising storing in the portable module a list of operating instructions for controlling an operation of the machine in the first and second modes and transmitting the list of operating instructions from the portable module to the machine to thereby reprogram the machine for operation in the first and second modes.

21. A method according to claim 13 wherein said connecting step comprises communicating from the controller of the machine to the programming module data including at least one of a cycle count indicative of a number of operating cycles performed by the machine, an identification of a portable module connected to the machine during a previous session, jaw cycle times indicative of a duration between a signal for controlling a motion of the machine and a resulting motion, shutdown log data indicative of previous terminations of operation of the machine, a value indicative of an input voltage provided to the machine during operation, volumes of types of foam dispensed by the machine, and amounts of film used by the machine for forming foam bags.

22. A method according to claim 13, further comprising operating each machine to dispense a foam in a consumable film material to form a wet bag in the first mode and continuous foam tubes in the second mode.

23. A method according to claim 13, further comprising comparing the consumable usage data received from a respective one of the machines in the connection session to a previous consumable usage data received from the respective machine in a previous connection session and thereby determining a portion of the consumable usage data that is indicative of an operation of the machine since the occurrence of the previous connection session.

24. A method according to claim 13 wherein said connecting step comprises providing a power output from the machine to the portable module to thereby power the portable module during the connection session.

25. A system according to claim 1 wherein each machine is configured to inflate an air filled packaging material.

26. A method according to claim 13, further comprising operating each machine to inflate an air filled packaging material.

* * * * *